United States Patent [19]

Hatch et al.

[11] Patent Number: 5,427,812
[45] Date of Patent: Jun. 27, 1995

[54] LOW-CALORIE POWDERED ICE TEA MIX

[75] Inventors: Elaine M. Hatch; George H. Beston; James P. Birch, all of Ontario, Canada

[73] Assignee: Kraft Foods, Inc., Northfield, Ill.

[21] Appl. No.: 219,332

[22] Filed: Mar. 28, 1994

[51] Int. Cl.6 .................................................. A23F 3/30
[52] U.S. Cl. ...................................... 426/548; 426/597
[58] Field of Search ............................... 426/548, 597

[56] References Cited

U.S. PATENT DOCUMENTS 3,660,107  5/1972  Mayer ............................... 426/597 X
5,114,726  5/1992  Tsau et al. ......................... 426/548 X
5,254,355  10/1993 Smith et al. ...................... 426/548 X Primary Examiner—Joseph M. Golian
Attorney, Agent, or Firm—Thomas R. Savoie; Thomas A. Marcoux

[57] ABSTRACT

There is disclosed a low-calorie powdered ice tea composition and a method for making the same. The ice tea composition comprises finely ground particles of ice tea solids; finely ground particles of at least one artificial sweetener; and a granulated citric acid where the granules have an average particle size where greater than about 90% of the particles have a size in the range of about 425 to about 1180 microns. With such a composition, the ice tea solids and the citric acid dissolve in a liquid at different rates.

22 Claims, No Drawings

LOW-CALORIE POWDERED ICE TEA MIX

BACKGROUND OF THE INVENTION

1. Field of the Invention

This invention relates to an improved low-calorie powdered ice tea mix.

More particularly, the present invention relates to a low-calorie powdered ice tea mix having improved dispersibility and solubility when mixed with liquid in the preparation of an ice tea beverage.

2. Description of the Related Art

Typical conventional powdered ice tea mixes normally comprise tea components, an artificial or natural sweetener (one or more) and a citric acid. Depending on the particular type of mix, normally the product is put into a container, followed by water addition and then stirred prior to drinking.

With the low-calorie powdered ice tea mixes of the prior art, the failure of the person preparing the beverage to follow the stated recipe of the product results in poor dispersibility and solubility of the powdered mix which in turn results in the reconstituted beverage being unattractive. Thus, if water is added to the container followed by the powdered ice tea mix being added to the water, even with agitation (such as stirring), one obtains a high level of undissolved tea or insolubles due to dispersability problems. This is particularly accentuated when using artificial or high intensity sweeteners and does not appear to be prevalent in powdered ice tea compositions using natural sweeteners.

Applicant has now discovered that the solubility problems of the prior art low-calorie powdered ice tea mixes occur when the acid and tea components are being dissolved simultaneously. Thus, it is believed that the poor dispersibility and solubility in low-calorie ice tea mixes when compared to regular powdered ice tea mixes is related to the presence of the high intensity sweeteners and thus the lack of physical bulk of such sweeteners in the mixes. In this respect, conventional powdered ice tea mixes employ citric acid which has a particle size where about 90% of the particles have a 180–425 micron size.

SUMMARY OF THE INVENTION

A feature of one embodiment of the present invention is to provide an improved low-calorie powdered ice tea mix with good dispersibility and solubility when mixed with liquid. Another feature of the present invention is to provide a powdered ice tea mix or composition which, when diluted with water, despite the user not following the proper recipe directions, results in a lower amount of insolubles or undissolved tea components in a prepared drink.

In accordance with an embodiment of the present invention there is provided a powdered ice tea composition comprising finely ground particles of ice tea solids, finely ground particles of at least one artificial sweetener and a granulated citric acid. The granules of the granulated citric acid have an average particle size where greater than about 90% of the particles are in the range of about 425 to about 1180 microns, whereby the ice tea solids and the citric acid dissolve in a liquid at different rates.

By virtue of the present invention, it is now possible to produce commercially acceptable, low-calorie powdered ice tea mixes which, when mixed with water, have good dispersibility and solubility thereby producing a consumer acceptable low-calorie ice tea beverage.

DETAILED DESCRIPTION OF THE INVENTION

A typical low-calorie powdered ice tea mix comprises tea solids, artificial sweetener and a citric acid. The powdered ice tea mix may also include other additives such as natural or synthetic tea aromas or flavours, colouring agents, additional sweeteners, preservatives, additional flavouring agents and the like.

Conventional tea solids may be employed in the present invention; such tea solids may typically include concentrates or the-like.

The tea solids may be those obtained by e.g. drying (e.g. spray-dried) tea extract although any other form of tea solids suitable for a powdered mix can be utilized. The tea extracts used to obtain the dried tea solids can be obtained from fermented or unfermented teas or mixtures thereof. The tea leaves can be enzyme treated as such treated tea leaves are believed to provide a higher yield of tea extract. The tea leaves, whether enzyme treated or not, can be processed in any conventional manner to provide the required tea extract. Pintaura, *Tea and Soluble Tea Products Manufacture*, (1977), pp.39–81 discloses various methods of obtaining tea extract from tea leaves.

Typically, after preparation of the tea extract, the tea extract is clarified by cooling to separate solids which form in a decreaming step. Removal of tea creams can be achieved by centrifugation, filtration, or any other suitable means. Depending on the desired tea solids concentration in the powdered ice tea mix, the extract can be further concentrated by suitable methods. The above noted Pintaura reference also discloses typical methods for decreaming, filtering and concentrating tea extracts. For spray-drying, the extract is usually concentrated to a solids level of about 20 to 35% by weight.

The amount of dried tea solids present in the compositions of the present invention may be present in an amount of from about 5 to 95% by weight of the total composition. Preferably, the amount of tea solids present is about 40 to about 50% by weight of the total composition. Of course, the higher the desired dilution ratio of water to composition, the higher the level of tea solids which should be present in the composition.

Preferably, the artificial sweetening agent is present in an amount of from about 1 about 10% by weight of the total composition. A particularly preferred amount of artificial sweetener is in the range of about 5 to about 8% by weight of the total composition. The artificial sweetener may be any suitable artificial sweetener or a mixture of several artificial sweeteners. Typical examples of such artificial sweeteners are aspartame compounds, cyclamates, sucraloses and the like. Sometimes, it may be desirable to combine one or more artificial sweeteners together or even naturally occurring sweeteners with synthetic sweeteners. It will be understood, having regard to the present invention, that the particle size of the artificial sweetener is not a critical factor relative to the particle size of the tea solids and the citric acid. Preferably, however, as is conventional, the artificial sweetener will have a relatively fine particle size in order to dissolve relatively quickly and typically this is approximately less than 150 microns.

In accordance with the present invention, it has been found that by employing coarsely granulated citric acid, there appears to be differential dissolution times for the tea solids and the acid so that improved solubility of the total composition is obtained. To this end, the coarser particles of citric acid would appear to dissolve more slowly and thus the improved solubility of the total composition is obtained.

The coarsely granulated citric acid is preferably present in the composition in an amount of about 5 to about 95% by weight of the total composition. Preferably, the coarsely granulated citric acid is present in an amount of about 30 to about 45% by weight of the composition. The coarsely granulated citric acid preferably has a particle size where greater than about 90% or more of the particles have a size ranging from about 425 to about 1180 microns. Particularly preferred is the above type of coarsely granulated citric acid where 93% or more of the particles have the above particle size range; the balance of the particles can be particles below the above range. In addition to citric acid, other conventional food grade acids may also be employed such as fumaric acid, adipic acid and the like.

As noted above, the mix may include other additives such as flavouring agents, preservatives, additional sweeteners, colouring agents, and the like. Typical examples of such other additives may include lemon oil flavouring agent, trisodium citrate, etc.

Having thus generally described the invention, reference will now be made to the following examples, describing preferred embodiments of the present invention.

EXAMPLE I

In this example, comparison of compositions according to the present invention with conventional compositions were carried out in order to demonstrate the improved attributes of this invention.

A first composition of a conventional low calorie powdered ice tea formulation containing the following ingredients was utilized (Composition A).

| Ingredients | Amounts - % By Weight (Rounded off to nearest %) |
|---|---|
| Conventional Ice Tea Solids | 45% |
| Sweetening Agent (*Aspartame) | 6% |
| Food Grade Acid (Citric Acid) (Having an average particle size where about 90% of the particles are in the range of about 180 to about 425 microns) | 34% |
| Flavouring Agents | 9% |
| Trisodium Citrate | 6% |
| TOTAL | 100% |

A second composition of a low calorie powdered ice tea formulation according to the present invention containing the following ingredients was utilized (Composition B).

| Ingredients | Amounts - % By Weight (Rounded off to nearest %) |
|---|---|
| Conventional Ice Tea Solids | 45% |
| Sweetening Agent (*Aspartame) | 6% |
| Citric Acid (Having an average particle size where greater than about 90% of the particles are in the range of about 425 to 1180 microns) | 34% |
| Flavouring Agents | 9% |
| Trisodium Citrate | 6% |
| TOTAL | 100% |

Compositions A and B were subjected to three procedures for formulating an ice tea drink.

In Test (1) 0.8 g of the product was placed into a container, water was added and the mixture was stirred for one minute; the resulting beverage was then observed and filtered for insolubles.

In Test (2) water was put into a container first, 0.8 g of the product was added and the mixture was stirred for one minute; the resulting beverage was then observed and filtered for insolubles.

In Test (3) 0.8 g of the product was put into the container first, water was forcefully added (directly from the cold water tap) and the product was left to sit for one minute; the resulting beverage was then observed and filtered for insolubles.

The following results were obtained when measuring the amount of insolubles for the different tests using the different compositions:

| Compositions | Test Method | Insolubles (g/1500 mL) |
|---|---|---|
| A | 1 | 0.1870 |
| B | 1 | 0.0281 |
| A | 2 | 0.7830 |
| B | 2 | 0.2317 |
| A | 3 | 0.3302 |
| B | 3 | 0.0391 |

From the above, it will be seen that compositions of the present invention (Composition B) using an average particle size for the citric acid where greater than about 90% of the particles have a size in the range of about 425 to about 1180 microns resulted in significantly reduced insolubles in the consumable liquid.

We claim:

1. A powdered ice tea composition comprising finely ground particles of ice tea solids, finely ground particles of at least one artificial sweetener and a granulated citric acid wherein the granules have an average particle size where greater than about 90% of the particles are in the range of about 425 to about 1180 microns, whereby said ice tea solids and said citric acid dissolve at different rates in a liquid.

2. The low calorie powdered ice tea mix of claim 1, wherein said citric acid has a particle size where about 94% of said particles are in the range of about 425 to about 1180 microns.

3. The low calorie powdered ice tea mix of claim 1, wherein said tea solids are present in an amount in the range of about 5 to about 95% by weight, said artificial sweetener is present in an amount in the range of about 1 to about 10% by weight, and said citric acid is present in an amount in the range of about 5 to 95% by weight.

4. The low-calorie powdered ice tea mix of claim 1, further comprising at least one flavouring agent.

5. The low-calorie powdered ice tea mix of claim 1, further comprising at least one colouring agent.

6. The low-calorie powdered ice tea mix of claim 1, further comprising at least one preservative.

7. The low-calorie powdered ice tea mix of claim 1, wherein said artificial sweetener is aspartame.

8. In a low-calorie powdered ice tea mix comprising dried tea solids, artificial sweetener and a citric acid, the improvement wherein said citric acid is a coarsely granulated citric acid having a particle size where greater than about 90% of said particles are in the range of about 425 to about 1180 microns.

9. The low calorie powdered ice tea mix of claim 8, wherein said citric acid has a particle size where about 94% of said particles are in the range of about 425 to about 1180 microns.

10. The low calorie powdered ice tea mix of claim 8, wherein said tea solids are present in an amount in the range of about 5 to about 95% by weight, said artificial sweetener is present in an amount in the range of about 1 to about 10% by weight, and said citric acid is present in an amount in the range of about 5 to 95% by weight.

11. The low-calorie powdered ice tea mix of claim 8, further comprising at least one flavouring agent.

12. The low-calorie powdered ice tea mix of claim 8, further comprising at least one colouring agent.

13. The low-calorie powdered ice tea mix of claim 8, further comprising at least one preservative.

14. The low-calorie powdered ice tea mix of claim 8, wherein said artificial sweetener is aspartame.

15. A low-calorie powdered ice tea composition comprising:
   from about 5 to about 95% by weight dried tea solids;
   from about 1 to about 10% by weight of artificial sweetener; and
   from about 5 to about 95% by weight of a coarsely granulated citric acid;
   wherein said citric acid has a particle size where greater than about 90% of said particles are in the range of about 425 to about 1180 microns.

16. The low-calorie powdered ice tea mix of claim 15, further comprising at least one flavouring agent.

17. The low-calorie powdered ice tea mix of claim 15, further comprising at least one colouring agent.

18. The low-calorie powdered ice tea mix of claim 15, further comprising at least one preservative.

19. The low-calorie powdered ice tea mix of claim 15, wherein said artificial sweetener is aspartame.

20. A method of reducing insolubles in a low-calorie ice tea beverage comprised of powdered ice tea mix and a liquid, said method comprising:
   providing a powdered ice tea mix having a citric acid, a tea component and an artificial sweetener, wherein the citric acid has an average particle size where greater than about 90% of said particles have a size within the range of about 425 to about 1180 microns; and
   dissolving the ice tea mix in a drinkable liquid, whereby the amount of insolubles are reduced compared to a similar composition where the citric acid component is of a smaller average particle size.

21. The method as claimed in claim 20, wherein said step of dissolving includes:
   (a) placing said ice tea mix into a container;
   (b) adding water to said container; and
   (c) stirring the ice tea mix and water mixture.

22. The method as claimed in claim 20, wherein said step of dissolving includes:
   (a) placing said ice tea mix into a container; and
   (b) forcefully adding water to said container.

* * * * *

UNITED STATES PATENT AND TRADEMARK OFFICE
CERTIFICATE OF CORRECTION

PATENT NO. : 5,427,812
DATED : Jun. 27, 1995
INVENTOR(S) : Elaine M. Hatch, et al.

It is certified that error appears in the above-indentified patent and that said Letters Patent is hereby corrected as shown below:

On title page, item [73], under the heading entitled "Assignee" change "Kraft Foods, Inc., Northfield, Ill." to read --Kraft General Foods Canada Inc., Ontario, Canada--.

Signed and Sealed this

Seventeenth Day of September, 1996

Attest:

BRUCE LEHMAN

Attesting Officer

Commissioner of Patents and Trademarks